(12) United States Patent
Chang et al.

(10) Patent No.: US 7,257,036 B2
(45) Date of Patent: Aug. 14, 2007

(54) METHOD AND APPARATUS FOR STORAGE DEVICE READ PHASE AUTO-CALIBRATION

(75) Inventors: Yi-Shu Chang, Tai-Nan (TW);
Seng-Huang Tang, I-Lan Hsien (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 522 days.

(21) Appl. No.: 10/711,442

(22) Filed: Sep. 19, 2004

(65) Prior Publication Data

US 2006/0080564 A1  Apr. 13, 2006

(30) Foreign Application Priority Data

Dec. 10, 2003  (TW) .............................. 92134816 A

(51) Int. Cl.
*G11C 7/00*  (2006.01)
(52) U.S. Cl. .................................. 365/194; 365/189.02
(58) Field of Classification Search ................ 365/191
See application file for complete search history.

(56) References Cited

U.S. PATENT DOCUMENTS

| | | | | |
|---|---|---|---|---|
| 4,600,895 A | * | 7/1986 | Landsman | 331/1 A |
| 5,066,868 A | * | 11/1991 | Doty et al. | 327/250 |
| 5,093,841 A | * | 3/1992 | Vancraeynest | 375/149 |
| 5,126,691 A | * | 6/1992 | Mijuskovic et al. | 331/1 A |
| 5,245,637 A | * | 9/1993 | Gersbach et al. | 375/374 |
| 5,561,692 A | * | 10/1996 | Maitland et al. | 375/371 |
| 6,760,856 B1 | | 7/2004 | Borkenhagen et al. | |
| 2005/0078021 A1 | * | 4/2005 | Cohen et al. | 341/68 |

* cited by examiner

*Primary Examiner*—Tan T. Nguyen
(74) *Attorney, Agent, or Firm*—Winston Hsu

(57) ABSTRACT

The present invention provides a method and apparatus for performing read phase auto-calibration of a storage device. The method includes writing the data with at least one predetermined pattern into the storage device, reading the data according to a read phase of a plurality of read phases, comparing the predetermined pattern with the data, and selecting a read phase from the plurality of read phases according to the comparing result.

19 Claims, 2 Drawing Sheets

METHOD AND APPARATUS FOR STORAGE DEVICE READ PHASE AUTO-CALIBRATION

BACKGROUND OF INVENTION

1. Field of the Invention

The present invention relates to storage devices, and more particularly, to a method and apparatus for performing read phase auto-calibration of a storage device.

2. Description of the Prior Art

Regarding the reading process of a storage device (DRAM, for example), a reference signal (DQS signal, for example) is generally used to latch the data stream of a data signal. The reference signal passes a comparator and a delay chain to generate a trigger signal for triggering the above-mentioned data stream latch procedure. The trigger signal is generally an output signal of a standard delay cell among the standard delay cells of the delay chain. The output signal of each standard delay cell corresponds to a read phase. For instance, in a delay chain with four standard delay cells, the output ports of the standard delay cells can respectively output trigger signals corresponding to read phases of 90 degrees, 180 degrees, 270 degrees, 360 degrees.

However, in accordance with the reference signal, the read phase of reading the data stored in the storage device is fixed; that is, a designer who utilizes the storage device has to select an output port for outputting the trigger signal from the output ports of the standard delay cells in the first place, wherein the output port is selected according to the related measurement and trial-and-error experiments, and the appropriate read phase for reading the storage device is determined accordingly. The above-mentioned experimenting/designing procedure consumes too much effort, time, and costs. If the related problem occurs in the manufacturing procedure, much more efforts are needed to optimize the printed circuit board of each product, so as to modify the read phase of reading the storage device.

SUMMARY OF INVENTION

One of the objectives of the claimed invention is therefore to provide a method and apparatus for performing read phase auto-calibration.

According to the claimed invention, a method for performing read phase auto-calibration of a storage device is disclosed. The method comprises: writing data with at least one predetermined pattern into the storage device; reading the data stored in the storage device by using at least one read phase of a plurality of read phases; comparing the read data with the predetermined pattern; and selecting a read phase from the plurality of read phases according to the comparing result.

According to the claimed invention, a circuit for performing read phase auto-calibration of a storage device is also disclosed. The circuit comprises: a control unit coupled to the storage device for determining a read phase among a plurality of read phases and outputting a multiplexing signal according to the determined read phase; a delay chain for generating a plurality of delay signal; and a multiplexer coupled to the control unit and the delay chain for selecting a delay signal among the delay signals according to the multiplexing signal.

These and other objectives of the present invention will no doubt become obvious to those of ordinary skill in the art after reading the following detailed description of the preferred embodiment, which is illustrated in the various figures and drawings.

DETAILED DESCRIPTION

Figure 1:
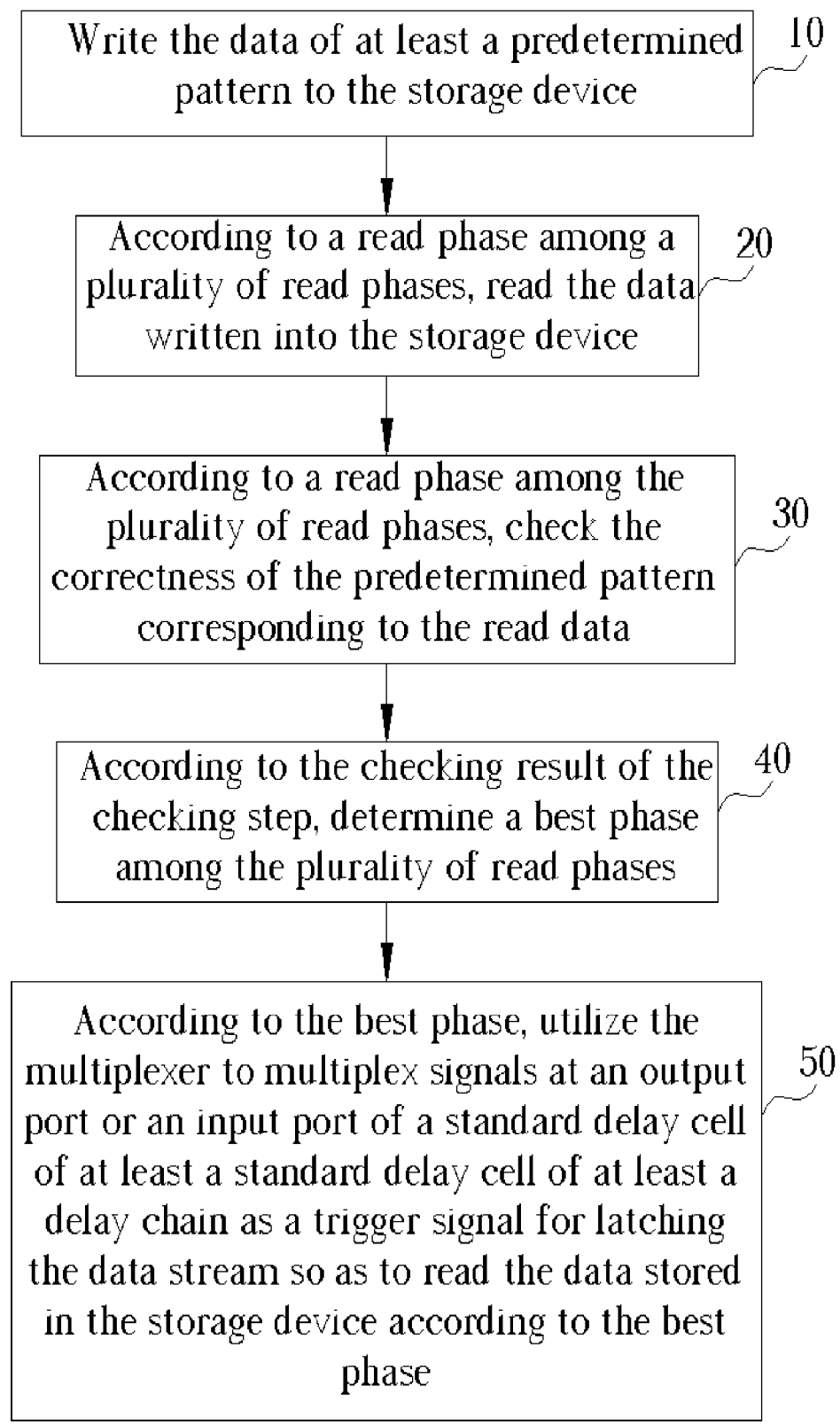
FIG. 1 is a flow chart of the read phase auto-calibration method according to an embodiment of the present invention.
Figure 2:
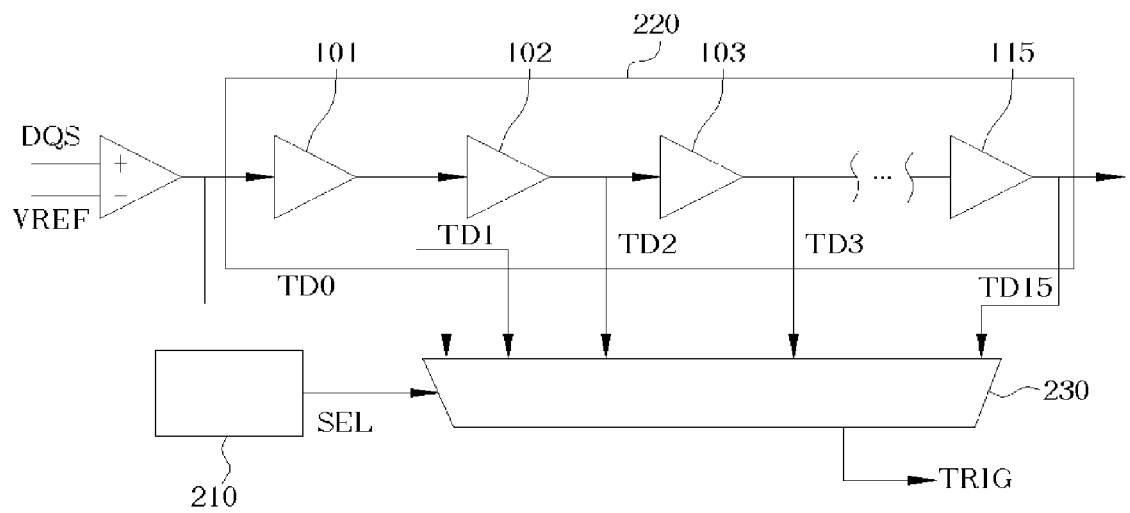
FIG. 2 is a schematic diagram showing the read phase auto-calibration device according to an embodiment of the present invention.

Please refer to both FIG. 1 and FIG. 2. FIG. 1 is a flow chart of the read phase auto-calibration method according to an embodiment of the present invention, while FIG. 2 is a schematic diagram showing the read phase auto-calibration device according to an embodiment of the present invention. The present invention provides the method of performing read phase auto-calibration for reading a storage device (in the present embodiment, the storage device is a DDR (Double Data Rate) memory). Please note that the steps 10, 20, 30, and 40 of the method as shown in FIG. 1 are performed in the control unit 210 shown in FIG. 2. The method of the claimed invention comprises the following steps and the order of the following steps does not serve as limitation to the scope of the present invention.

step 10: Write the data with at least one predetermined pattern into a storage device;

step 20: Read the data from the storage device by using a read phase among a plurality of read phases (in the present embodiment, the total amount of the read phases is 16), wherein the plurality of read phases are relative to a reference signal, and the reference signal may be a strobe signal or a clock signal;

step 30: For the read phase among the plurality of read phases, check the correctness of the read data acquired in the reading step of step 20 with respect to the predetermined pattern;

step 40: Determine a most suitable phase among the plurality of read phases according to the checking result of step 30; and step 50: Utilize a multiplexer 230 for selecting an output or input signal of at least one standard delay cell in a delay chain 220, so as to latch a trigger signal of a data stream outputted by the storage device, and thus to read the data stored in the storage device by the most suitable phase.

In step 10, at least one of the predetermined pattern may be a hexadecimal number 5 or A, which respectively translates to binary numbers 0101 or 1010. In the present embodiment, the predetermined pattern in step 10 is hexadecimal numbers 5A or A5, which translates to binary numbers 01011010 or 10100101. For instance, repeating step 10 four times represents writing (5A5A5A5A, A5A5A5A5) into the address (0, 1). In step 20, the data with at least one predetermined pattern is read from address (0, 1) according to 16 phases n (n=15, 14, . . . , 0). In step 30, check whether the data read by different phases match the predetermined pattern 5A or A5, and the checking results can be stored into a two-dimensional matrix Result[m][n], (m=3, 2, 1, 0, respectively corresponding to the four operations in step 10). The checking result Result[m][n]=1 represents that the data are correct, and the checking result Result[m][n]=0 represents that the data are incorrect. In step 40, select as the most suitable phase a middle phase of the consecutive phases without read error among the 16 read phases. The middle phase is at a center position or an approximately center position of the consecutive phases without read error. For instance, when a checking result Result[m][15:0] is 0000111110000000, wherein the values in sequence are respectively corresponding to the phases n=15, 14, . . . , 0, the center position of the consecutive phases without read error (i.e. n=11, 10, 9, 8, 7) is determined as the most suitable phase (i.e. n=9). A start point start_pt is defined as the point corresponding to the first appearance of "1" in the sequence Result[m][15:0] (n=11 is the start_pt in this embodiment), and an ending point end_pt is defined as the point corresponding to the first appearance of "0" following the consecutive appearance of "1" (the end_pt is corresponding to the phase n=7 in this embodiment). Therefore, the most suitable phase can be obtained as:

Best_phase=start_pt+(end_pt−start_pt)/2=(start_pt+ end_pt) /2=(11+7)/2=9.

In the present embodiment, the storage device can be a DRAM, and the reference signal is a DQS signal. DQS signal is converted into a trigger signal TD0 through a comparator. The multiplexing signal SEL outputted by the control unit 210 corresponds to the plurality of read phases, the trigger signal TD0, and the delayed trigger signals TD1, TD2, TD3, . . . , TD15. Therefore, in step 50, a trigger signal TRIG is selected from the trigger signals TD0, TD1, TD2, TD3, . . . , TD15 according to the multiplexing signal SEL, wherein the multiplexing signal SEL is determined by the most suitable phase.

Please refer to FIG. 2. The present invention also provides a circuit of performing read phase auto-calibration for reading the storage device. The circuit includes: a control unit 210 (in the present embodiment, the control unit 210 is a digital signal processor or a firmware) coupled to the storage device to determine a most suitable phase among a plurality of read phases and to output a multiplexing signal SEL according to the most suitable phase, a delay chain 220 including plural delay units 101, 102, . . . , 115 used to generate plural delay signals, such as the previously mentioned trigger signals TD0, TD1, TD2, TD3, . . . , TD15), and a multiplexer 230 coupled to the control unit 210 and the delay chain 220 used for selecting a delay signal from the delay signals according to the multiplexed signal SEL, so as to latch the data stream outputted by the storage device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing read phase auto-calibration of a storage device, the method comprising:
    writing data with at least one predetermined pattern into the storage device;
    reading the data stored in the storage device by using at least one read phase of a plurality of read phases;
    comparing the read data with the predetermined pattern; and
    selecting a read phase from the plurality of read phases according to the comparing result.

2. The method of claim 1, wherein the plurality of read phases are relative to a reference signal.

3. The method of claim 2, wherein the reference signal is a strobe signal or a clock signal.

4. The method of claim 1, wherein the storage device is a dynamic random access memory (DRAM).

5. The method of claim 1, wherein the storage device is a double-data-rate (DDR) memory.

6. The method of claim 1, wherein the predetermined pattern is a hexadecimal number which can be equally transformed into to a binary number.

7. The method of claim 1, wherein the step of reading the data is to read the predetermined pattern stored in the storage device.

8. The method of claim 1, wherein the step of comparing is to check whether the data read from the storage device match the predetermined pattern.

9. The method of claim 1, wherein the read phase selected in the selecting step is determined from the phases without read error among the plurality of read phases.

10. The method of claim 1, wherein the step of selecting the read phase is to select a middle phase from consecutive phases without read error among the plurality of read phases.

11. The method of claim 10, wherein the position of the middle phase is at a center position or an approximately center position of the consecutive phases without read error.

12. A circuit for performing read phase auto-calibration of a storage device, the circuit comprising:
    a control unit coupled to the storage device for determining a most suitable phase among a plurality of read phases and outputting a multiplexing signal according to the most suitable phase;
    a delay chain for generating a plurality of delay signals; and
    a multiplexer coupled to the control unit and the delay chain for selecting a delay signal among the delay signals according to the multiplexing signal;
    wherein the control unit reads data stored in the storage device for at least two times according to at least two of the read phases and compares the read data with a predetermined pattern to determine the most suitable phase.

13. The circuit of claim 12, wherein the control unit is a digital signal processor.

14. The circuit of claim 12, wherein the control unit is a firmware.

15. A circuit for performing read phase auto-calibration of a storage device, is the circuit comprising:
    a control circuit coupled to the storage device for reading given data stored in the storage device according to different read phases, determining a plurality of consecutive phases among the read phases appropriate for correctly reading the given data, and determining a most suitable phase among the consecutive phases and outputting a multiplexing signal according to the most suitable phase;
    a delay circuit for generating a plurality of delay signals; and
    a multiplexer coupled to the control circuit and the delay circuit for selecting a delay signal among the delay signals according to the multiplexing signal.

16. The circuit of claim 15, wherein the control circuit is a digital signal processor.

17. The circuit of claim 15, wherein the control circuit is a firmware.

18. The circuit of claim 15, wherein the control circuit reads the given data stored in the storage device by using at least two of the read phases and compares the read given data with a predetermined pattern to determine the most suitable phase.

19. The circuit of claim 15, wherein the most suitable phase is at a center position or an approximately center position of the consecutive phases.

* * * * *